United States Patent [19]

Dean

[11] Patent Number: 5,544,675
[45] Date of Patent: Aug. 13, 1996

[54] FRANGIBLE VALVE HANDLE

[75] Inventor: Robert H. Dean, Evanston, Ill.

[73] Assignee: Midland Manufacturing Corp., Skokie, Ill.

[21] Appl. No.: 556,290

[22] Filed: Oct. 6, 1995

[51] Int. Cl.⁶ .................................................. F16K 35/04
[52] U.S. Cl. .............................. 137/797; 403/2
[58] Field of Search .................. 137/797; 403/2

[56] References Cited

U.S. PATENT DOCUMENTS

| | | |
|---|---|---|
| 1,512,192 | 10/1924 | Benkö. |
| 2,843,152 | 7/1958 | Laird et al. .............................. 137/797 |
| 3,540,481 | 11/1970 | Peters ...................................... 137/797 |
| 3,701,362 | 10/1972 | Reese . |
| 4,030,696 | 6/1977 | Bake et al. . |
| 4,051,866 | 10/1977 | Bake et al. . |
| 4,072,161 | 2/1978 | Schoeneweis et al. . |
| 4,141,538 | 2/1979 | Bake et al. . |
| 4,463,777 | 8/1984 | Taniguthi et al. . |
| 4,497,344 | 2/1985 | Kisiel . |
| 4,794,944 | 1/1989 | Henry . |
| 4,905,725 | 3/1990 | Sinkinson et al. . |
| 4,980,975 | 1/1991 | Hodson . |
| 5,063,671 | 11/1991 | Huang . |
| 5,179,783 | 1/1993 | Melter . |
| 5,199,332 | 4/1993 | Batten . |
| 5,381,709 | 1/1995 | Louw . |

Primary Examiner—Gerald A. Michalsky
Attorney, Agent, or Firm—Emrich & Dithmar

[57] ABSTRACT

A torque limiting valve handle for rotating a shaft of a valve is provided. The valve handle includes an elongated arm having a first opening therein adjacent to one end thereof forming an inner surface and a first channel formed in the inner surface. The handle also includes a hub disposed in the first opening and engagable with the shaft. The hub has an exterior surface and a second channel formed in the exterior surface and a drive position relative to the arm wherein the first and second channels cooperate to define a pocket. The handle further includes a shear pin disposed in the pocket for preventing rotation of the hub relative to the arm so that the hub rotates in response to rotation of the arm to apply torque to the shaft to rotate the shaft. The pin is frangible in response to application thereto of a force in excess of a predetermined force to allow relative rotation of the hub and the arm and prevent application to the shaft of a torque greater than a predetermined torque.

13 Claims, 2 Drawing Sheets

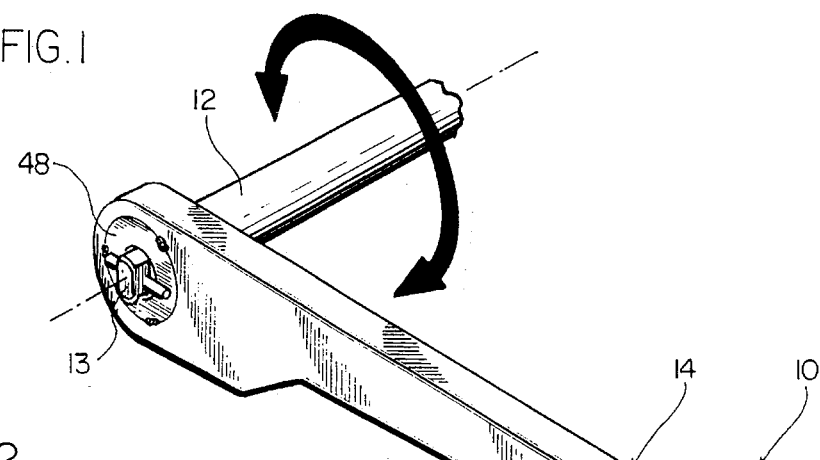
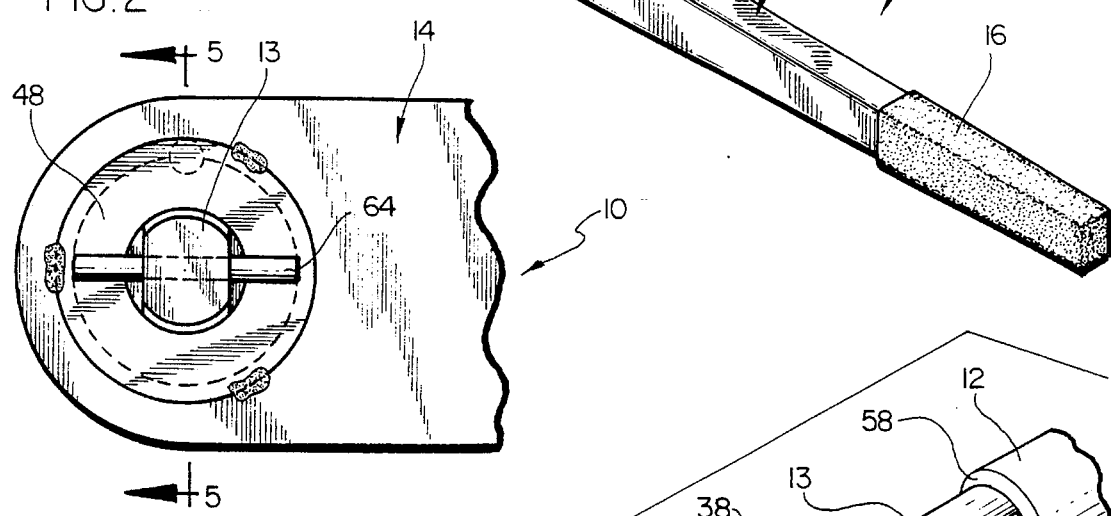
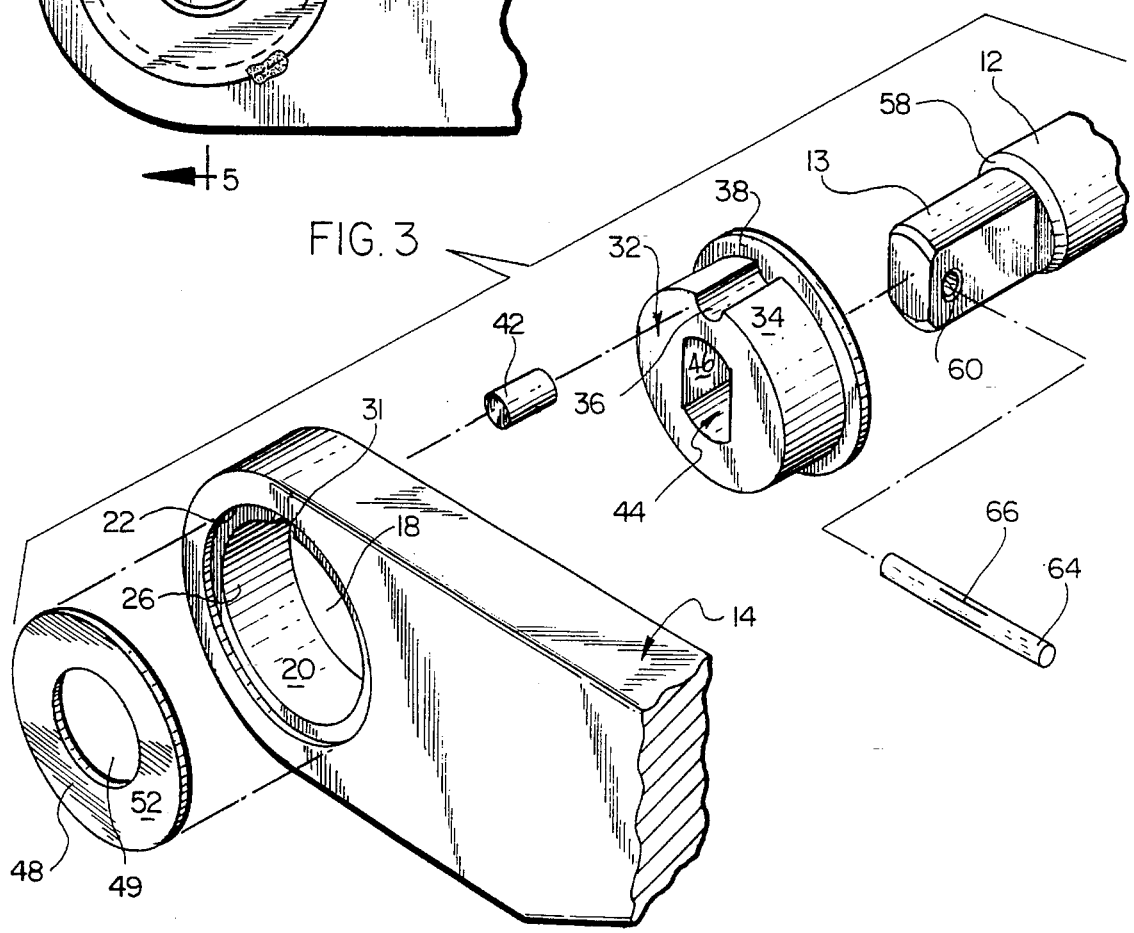

FRANGIBLE VALVE HANDLE

BACKGROUND OF THE INVENTION

1. Field of the Invention

This invention relates to valves, and more particularly to valve handles used to rotate a valve closure member between open and closed positions.

2. Description of the Prior Art

In valves, such as a rotary or piston-type valves, a shaft is rotated for operating a closure member between open and closed positions. An elongated valve handle is typically disposed about and engaged with the shaft of the valve. The handle applies torque to the shaft to rotate the shaft. Many times these type valves are used on a bottom outlet valve of a tank car. Often liquid material stored in these tank cars solidifies or congeals. This solidified material makes it difficult or impossible to rotate the shaft to open the valve. To properly remove the solidified material from the tank car without damaging the valve the material should first be reliquified by heating or other means. This reliquifying, however, takes time. Workers, who are under time pressure to unload the tank cars, do not always attempt to liquify the tank car contents or do not wait the requisite amount of time until the contents are completely liquified. Subsequently, the workers need to forcibly rotate the handle attached to the valve to open the valve. This often results in excessive torque being applied to the shaft which often damages the valve.

It is known in such valves to employ a frangible element adapted to fail and prevent excessive torque from being transmitted to the valve mechanism. These frangible elements typically do not form a portion of the valve handle itself, but are usually integral with a member connected to the shaft of a valve and are not therefore separate, individual pieces. Since these elements are often connected to such a member, rather than simply the frangible element, must be replaced when the element fails which adds to the cost of repair. Also, since these members are not typically disposed on an external, readily accessible area, once the frangible elements fail, a great time and effort is required to disassemble the valve assembly to remove and replace the members with the failed elements. Additionally, most valve assemblies with frangible elements have no means of confining the frangible elements once they have failed. These non-confined elements can strike or injure a user or travel elsewhere.

SUMMARY OF THE INVENTION

It is a general object of the invention to provide an improved frangible valve handle which avoids the disadvantages of prior handles while affording additional structural and operational advantages.

An important feature of the invention is the provision of a frangible valve handle which is of a relatively simple and economical construction.

In connection with the foregoing feature, yet another feature of the invention is the provision of a valve handle of the type set forth which prevents the frangible portion from interfering with the operation of the valve or injuring a user of the handle after the pin fractures.

A still further feature of the invention is the provision of an apparatus of the type set forth which can be adjusted to vary the maximum amount of torque that can be applied to a valve shaft.

These and other features of the invention are attained by providing a torque limiting valve handle for rotating a shaft of a valve. The valve handle includes an elongated arm having a first opening therein adjacent to one end thereof forming an inner surface and a first channel formed in the inner surface. The handle also includes a hub disposed in the first opening and engagable with the shaft. The hub has an exterior surface and a second channel formed in the exterior surface and a drive position relative to the arm wherein the first and second channels cooperate to define a pocket. The handle further includes a shear pin disposed in the pocket for preventing rotation of the hub relative to the arm so that the hub rotates in response to rotation of the arm to apply torque to the shaft to rotate the shaft. The pin is frangible in response to application thereto of a force in excess of a pre-determined force to allow relative rotation of the hub and the arm and prevent application to the shaft of a torque greater than a predetermined torque.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a valve handle, in accordance with the present invention, engaged with a valve shaft;

FIG. 2 is an enlarged, fragmentary, top plan view of the handle and shaft of FIG. 1;

FIG. 3 is an exploded, fragmentary, perspective view of the handle and shaft of FIG. 2;

DETAILED DESCRIPTION OF THE PREFERRED EMBODIMENTS

Figure 4:
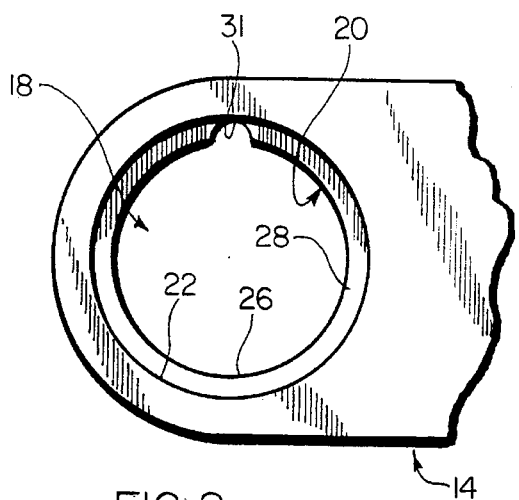
FIG. 4 is a fragmentary top plan view of the arm of the valve shaft.

Referring to FIGS. 1–3, a valve handle 10 is provided. As discussed below, the valve handle 10 is engaged with a shaft 12 of a valve (not shown) having an outer end 13. The shaft 12 can be attached to almost any type of valve which uses a rotatable shaft for opening and closing, including ball-type and piston-type valves. The valve handle 10 includes an elongated arm 14. The elongated arm 14 includes a grip 16 at one end and, as seen in FIG. 3, a generally cylindrical opening 18 which forms an inner surface 20 at the other end.

Figure 5:
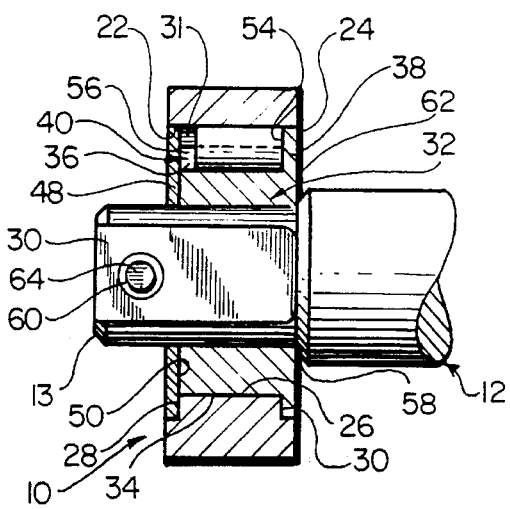
FIG. 5 is a fragmentary sectional view taken generally along line 5—5 of FIG. 2.

Referring also to FIGS. 4 and 5, the inner surface 20 has a first end section 22 having a first diameter, a second end section 24 having a second diameter, and a midsection 26 having a third diameter disposed between the first and second sections. The third diameter is smaller than the first and second diameters whereby, as seen in FIGS. 3–5, a first annular shoulder surface 28 is formed between the first end section 22 and the midsection 26 and a second annular shoulder surface 30 is formed between the midsection 26 and second end section 24. A part-cylindrical channel 31 is formed in and runs the length of the midsection 26 parallel to the axis thereof.

The handle 10 also includes a substantially cylindrical hub 32 having an exterior cylindrical surface 34 and a second part-cylindrical channel 36 formed in the exterior surface 34. The exterior surface 34 has a diameter slightly less than the diameter of the midsection 26. The hub 32 also includes an annular flange 38 projecting radially outwardly from the exterior surface 34 at one end of the hub 32. The flange 38 has a diameter slightly less than the diameter of the second end section 24 and a thickness substantially equal to the depth of the second end section 24.

Figure 6:
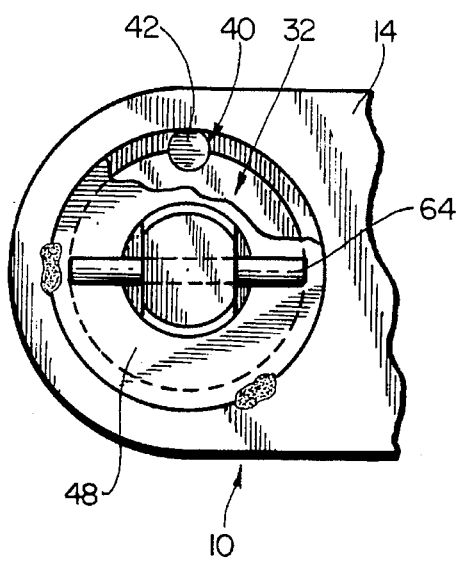
FIG. 6 is a view similar to FIG. 2 with a portion of a washer broken away.

The hub 32 is disposed in the opening 18 so that the midsection 26 of the inner surface 20 faces the exterior surface 34 of the hub 32 and the second shoulder surface 30 abuts the flange 38. The hub 32 is oriented so that second channel 36 faces the first channel 31 for cooperation therewith to define, as best seen in FIGS. 5–6, a cylindrical pocket 40.

The valve handle 10 also includes a cylindrical frangible shear pin 42. The shear pin 42 is disposed in the pocket 40 and couples the arm 14 to the hub 32. As discussed below, the pin 42 causes rotation of the hub 32 in response to rotation of the arm 14 to apply torque to the shaft 12 in order to rotate the shaft in either the clockwise or counterclockwise direction, as seen by the double-headed arrow in FIG. 1.

The hub 32 also has a central opening 44 which forms an inner surface 46 which has the same cross-sectional shape as and is slightly larger than the outer end 13 of the shaft 12, so that the outer end 13 can be disposed in the opening 44 and engaged with the hub 32.

The handle 10 also includes a washer 48 having an opening 49 and disposed in the second end section 24 of the opening 18. The washer 48 has an inner face 50 (FIG. 5) which abuts the first shoulder section 28 and an outer face 52. The washer 48 is attached to arm 14, such as be tack-welding.

As best seen in FIG. 5, a portion of the flange 38 overlies a first end 54 of the pocket 40 and forms a first end face of the pocket 40 and a portion of the washer 48 overlies a second end 56 of the pocket 40 and forms a second end face of the pocket 40. These end faces limit the axial movement of the pin and maintain the pin 42 within the pocket 40.

As seen in FIGS. 1–2 and 5–7, the opening 44 of the hub 32 is placed over the outer end 13 of the shaft 12 and the handle 10 is moved axially along the outer end 13 of the shaft 12 until the hub 32 contacts a shoulder surface 58 of the shaft 12 and a portion of the outer end 13 of the shaft 12 extends through the opening 49 of the washer 48.

The outer end 13 of the shaft 12 includes a bore 60 therethrough which is disposed at a distance from the shoulder surface 58. This distance is slightly greater than the distance between the outer face 52 of the washer 48 and an inner face 62 of the hub. After the handle 10 has been placed on the shaft 12, a drive pin 64 is inserted, usually with a hammer, through the bore 60 so as to lie over portions of the washer 48, to maintain the pin 64 in the bore 60. As seen best in FIGS. 2 and 5, the pin 64 has a diameter substantially equal or slightly less than the bore 60. The middle section of the pin 64 has chisel marks 66 (or is knurled) (see FIG. 3) to provide an interference fit, so that the pin 64 is maintained in the bore 60. The pin 64 and the shoulder surface 58 prevent or limit axial movement of the arm 14 and hub 32 so that the hub 32 is maintained in the opening 18 of the arm 14 and the handle 10 is maintained on the shaft 12 to engage the same.

As discussed above, the shear pin 42 disposed in the pocket 40 prevents the rotation of the hub 32 relative to the arm 14, so that the hub 32 rotates in response to rotation of the arm to apply torque to the shaft 12. The shear pin 42 is constructed to be frangible. The hub 32 and arm 14, though not always constructed of the same material, are constructed of a hard material, such as steel or other metal. The shear pin 42 is advantageously constructed of a material usually softer than both the arm 14 and the hub 42. For example, if the arm 14 and hub 32 are constructed of steel, the pin 42 can be constructed of soft brass. In any case, the shear pin 42 material is a ductile material with a shear strength capable of withstanding compressive loads or forces less than the compressive loads the channel 36 in the hub 32 or the channel 31 in the arm 14 can withstand, before deformation or failure. This causes the pin 42 to shear before either of the channels 31, 36 are deformed.

The shear pin 42 is designed to fracture diametrically when a pre-determined compressive load is applied to it so that the amount of torque that can be applied to the shaft 12 is limited and damage will not occur to the shaft 12 and/or the valve. For example, if the shaft 12 can withstand 600 ft.-lbs. of torque before damage occurs, the pin 42 is usually designed to fracture before 450 ft.—lbs. of torque is applied to the shaft.

The compressive load the pin 42 can withstand prior to shearing is directly proportional to its shear area, i.e., the cross-sectional area thereof along a diametrical plane. Thus, the greater the length and/or diameter of the pin 42, the greater the compressive load required to shear it, and vice versa. The cylindrical shear pin 42 can be designed to withstand various compressive loads which allows for the handle 10 to be used on a wide variety of valve shafts capable of withstanding various amounts of torque. For example, the shear pin 42 can have a length substantially equal to the length of the pocket 40 ("a full length pin"), or, as seen in FIG. 5, the shear pin 42 can have a smaller length. Also, the diameter of the pin 42 (and the pocket 40) can similarly be varied.

In addition to varying the length or diameter of the shear pin 42, to limit the maximum amount of torque to be applied to the shaft, the shear pin 42 can be constructed of materials of different hardness. The softer the material, the less compressive load the shear pin 42 can withstand and the less torque which can be applied to the shaft 12 before the shear pin 42 fractures.

Figure 7:
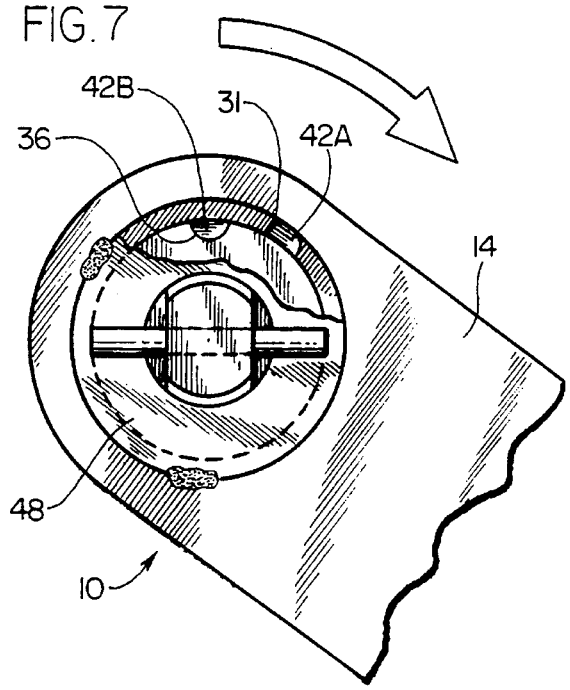
FIG. 7 is a view similar to FIG. 6 and rotated about 45° clockwise, wherein the shear pin has been broken and the handle has been placed in the non-torquing condition.

Referring to FIGS. 6 and 7, FIG. 6 illustrates the shear pin 42 disposed in the pocket 40 so that rotation of the arm 14 causes rotation of the hub 32 to apply torque to the shaft 12.

FIG. 7 illustrates the handle 10 after the shear pin 42 has fractured due to too much of a compressive load being applied to the shear pin 42. After the shear pin 42 has fractured, a first fragment 42A of the shear pin 42 is retained in the first channel 31 and a second fragment 42B of the shear pin 42 is retained in the second channel 36, whereby the elongated arm 14 can rotate relative to the hub 32 so that destructive torque is not applied to the shaft 12. The washer 48 and the flange 38 maintain the fractured pin fragments 42A, 42B in the first and second channels 42A, 42B, respectively. This prevents the fragments 42A, 42B from striking a user or from travelling to a place where they may interfere with operation of the valve.

The valve handle 10 is quickly and easily repaired if the shear pin 42 fractures. The drive pin 64 is simply removed from the bore 60, the valve arm 14 is taken off the hub 32 and the confined fragments 42A, 42B are discarded. A new shear pin is then set in channel 36 and the arm 14 is reassembled.

The valve handle 10 is normally designed to be used with and permanently engaged with only one shaft 12. As discussed above, in this permanent condition, the pin 64 and the shoulder surface 58 of the shaft 12 maintain the hub 32 in the opening 18 of the arm 14. The valve handle 10, however, can easily be designed to be portable and engagable with various valve shafts. The outside diameter of the shear pin 42 is either simply increased to be substantially equal to the inside diameter of the pocket 40 or the shear pin 42 is knurled so that an interference fit is formed between the hub 32, elongated arm 14 and the shear pin 42 so that the hub 32 is independently maintained in the opening 18 by the valve handle 10 itself.

The valve handle 10 is usually subject to harsh conditions due to the environment or spillage from the materials contained in the tank or containers the valve is attached to. The hub 32 and the elongated arm 14 are, therefore, usually teflon coated or otherwise lubricated. This lubrication prevents the inner surface 20 formed by the opening 18 and the exterior surface of the hub 32 from rusting and fusing together. This fusion would lessen the compressive load applied to the shear pin 42 so that the shear pin 42 would not fracture at the point it was designed to, which could cause excessive torque to be applied to and possible damage to occur to the shaft 12.

Figure 8:
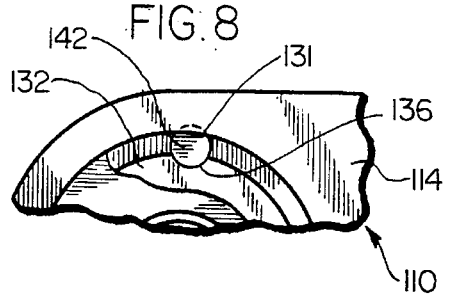
FIG. 8 is a fragmentary view, similar to the upper portion of FIG. 6, of an alternative embodiment wherein the volume of the channel formed in the elongated arm is greater than the volume of the channel formed in the hub whereby a greater volume of the shear pin is disposed in the channel formed in the elongated arm.

If the hub 32 and elongated arm 14 are formed of different materials, it may be advantageous or necessary that the channels 31, 36 have different volumes. The channel formed of the softer material may be designed to be deeper and have a greater volume than the channel formed of the harder material. This aids in preventing deformation of the channel made of the softer material and thereby allows the shear pin 42 to be constructed of a material able to withstand a greater compressive load. For example, as seen in FIG. 8, an alternative valve handle 110 is provided. The valve handle 110 has an elongated arm 114 and a hub 132 constructed of a harder material than the material of which the elongated arm 114 is constructed. The elongated arm 114 has a channel 131 formed in a surface 118 thereof that is deeper and has a greater volume than a channel 136 formed in the hub 132. The channel 131, being deeper, provides a greater bearing surface for a shear pin 142 and allows the channel 131 to withstand a greater compressive load than a shallower channel which, therefore, allows a stronger material shear pin 142 to be employed without deforming either the arm 114 or the hub 132.

Figure 9:
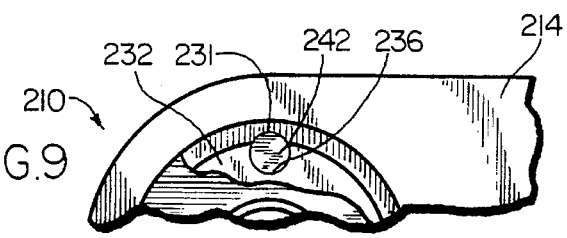
FIG. 9 is a view similar to FIG. 8 of a third embodiment, wherein the volume of the channel formed in the elongated arm is less than the volume of the channel formed in the hub whereby a greater volume of the shear pin is disposed in the channel formed in the hub.

Likewise, as seen in FIG. 9, a third alternative valve handle 210 is provided which has a hub 232 and an elongated arm 214 constructed of a harder material than the hub 232. A channel 236 formed in the hub 232 is deeper and has a greater volume than a channel 231 formed in a surface 218 of the elongated arm 214. The channel 236, like channel 131, being deeper, provides a greater bearing surface and allows the channel 236 to withstand a greater compressive load.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A torque limiting valve handle for rotating a shaft of a valve, the valve handle comprising:

an elongated arm having a first opening therein adjacent to one end thereof forming an inner surface and a first channel formed in the inner surface;

a hub disposed in the first opening and engagable with the shaft, the hub having an exterior surface and a second channel formed in the exterior surface;

the hub having a drive position relative to the arm wherein the first and second channels cooperate to define a pocket; and a shear pin disposed in the pocket for preventing rotation of the hub relative to the arm so that the hub rotates in response to rotation of the arm to apply torque to the shaft to rotate the shaft, the pin being frangible in response to application thereto of a force in excess of a pre-determined force to permit relative rotation of the hub and the arm and prevent application to the shaft of a torque greater than a predetermined torque.

2. The handle of claim 1, wherein the first opening and the hub are generally cylindrical.

3. The handle of claim 2, wherein the first and second channels are part cylindrical and the pocket is cylindrical.

4. The handle of claim 3, wherein the shear pin is cylindrical.

5. The handle of claim 4, wherein the pocket and shear pin are substantially coaxial and the hub has an axis parallel to the axis of the shear pin and pocket.

6. The handle of claim 4, wherein the elongated arm, the hub and the shear pin are constructed of first, second and third materials, respectively, and the third material is softer than both the first and second materials.

7. The handle of claim 6, wherein the first and second channels, respectively have first and second volumes, and wherein the first volume is less than the second volume, whereby a greater volume of the shear pin is disposed in the second channel.

8. The handle of claim 7, wherein the first material is harder than the second material.

9. The handle of claim 6, wherein the first and second channels, respectively have first and second volumes and wherein the second volume is less than the first volume, whereby a greater volume of the shear pin is disposed in the first channel.

10. The handle of claim 9, wherein the first material is softer than the second material.

11. The handle of claim 2, wherein the inner surface has a first and second outer sections respectively having first and second diameters a midsection disposed between the first and second outer sections and having a third diameter smaller than the first and second diameters, wherein a first shoulder surface is formed between the first section and midsection and a second shoulder surface is formed between the second section and the midsection, the hub including a circular flange projecting from the exterior surface and disposed in the first outer section in engagement with the first shoulder surface to define a first end face of the pocket.

12. The handle of claim 11, wherein the handle further includes a washer attached to the arm and disposed in the second outer section in engagement with the second shoulder surface to define a second end face of the pocket, whereby the first and second end faces axially maintain the pin within the pocket.

13. The handle of claim 1, wherein the shaft has an outer end and the hub has an engaging opening therein to engage the outer end whereby the outer end is engagable in the engaging opening to allow the handle to apply torque to the shaft.

* * * * *